United States Patent Office 3,201,469
Patented Aug. 17, 1965

3,201,469
POLYAMINES FROM DIPHENYL ETHER
Lawrence F. Sonnabend, Midland, Mich., assignor to The Dow Chemical Company, Midland, Mich., a corporation of Delaware
No Drawing. Filed Feb. 6, 1963, Ser. No. 256,506
10 Claims. (Cl. 260—570.5)

This invention relates to new polyamines and more particularly to new polyamines derived from diphenyl ether. Still more particularly, it relates to novel polyamines containing a plurality of basic amino groups and one or more diphenyl ether moieties.

This application is a continuation-in-part of copending United States patent application Serial No. 99,076, filed March 29, 1961, and now abandoned.

These novel polyamines are obtained by the condensation of (1) a halomethyldiphenyl ether selected from the group consisting of (a) halomethyldiphenyl ethers of the general formula:

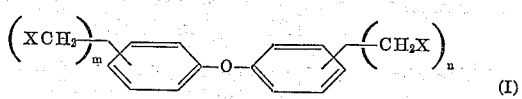

(I)

wherein $m$ is an integer from 1 to 2, $n$ is an integer from 0 to 2, and X is chlorine or bromine, and (b) mixtures thereof; with (2) at least one alkylene polyamine of the general formula:

$$NH_2(C_aH_{2a}NH)_bH \quad (II)$$

wherein $a$ is an integer from 2 to 6, and $b$ is an integer from 1 to 4; said reactants being used in such proportions that the mole ratio of alkylene polyamine to halomethyl groups is at least 1.5. When the condensation is essentially complete, the desired polyamines are recovered by treating the mixture to give the free amine followed by removing excess, unreacted alkylene polyamine and purifying of the resulting product as required.

The polyamines obtained by this process are characterized by low volatility and high thermal stability. Physically, they range from clear liquids miscible with water and many polar organic solvents to rubbery polymers insoluble in but softened and swollen by such polar solvents. These polyamines are all highly useful as curing agents for epoxy resins. The incorporation of the diphenyl ether moiety in the structure of the cured resins imparts such highly desirable properties as improved low temperature resiliency and water resistance.

The halomethyldiphenyl ether utilized as starting materials in the synthesis of the polyamines described herein are well-known materials that are readily obtained by the chloromethylation or bromomethylation of diphenyl ether, preferably as described by Doedens in United States Patent 2,911,380. Since halomethylation occurs largely at the 2 and 4 positions of each aromatic ring, the crude halomethyldiphenyl ether thereby obtained is predominately a mixture of isomers and homologs having from 1 to 4 halomethyl groups per diphenyl ether moiety. The exact composition is dependent upon reaction conditions, and particularly on the proportion of halomethylating agent employed.

For use in the process described herein individual halomethyldiphenyl ether having from 1 to 3 halomethyl groups per diphenyl ether moiety can be easily isolated and purified from the crude reaction product. Particularly desirable as intermediates in the synthesis of the polyamines are the 4,4' - bis(halomethyl)diphenyl ethers which are recovered in high yields from crude halomethylation products by the process described by Doedens and Rosenbrock in United States Patent 3,004,072. Examples of other purified halomethyldiphenyl ethers which can be employed in the synthesis of the polyamines described herein include 4-(chloromethyl)diphenyl ether, 2,4,4'-tris(chloromethyl)diphenyl ether, 4-(bromomethyl) diphenyl ether and 4,4'-bis(bromomethyl)diphenyl ether.

In many instances it is advantageous to use a crude halomethyldiphenyl ether having an average of from about 1 to 3 halomethyl groups per diphenyl ether moiety. Particularly satisfactory results are often obtained with a crude mixture having an average of about 2 halomethyl groups per diphenyl ether moiety. For example, valuable polyamine products are obtained using a crude chloromethyldiphenyl ether (CMDPE) containing 25.2 weight percent chlorine and having an average of 1.85 chloromethyl groups ($ClCH_2$—) per diphenyl ether (DPE) moiety. A typical composition of this and several other crude chloromethyldiphenyl ethers is given in Table I.

TABLE I.—TYPICAL POLY(CHLOROMETHYL)DIPHENYL ETHER COMPOSITIONS

| CMDPE | 17 | 25 | 32 |
|---|---|---|---|
| Wt. percent Cl | 17.6 | 25.2 | 32.0 |
| Mole ratio: $ClCH_2$—/DPE | 1.10 | 1.85 | 2.80 |
| Composition (mole percent): | | | |
| Diphenyl Ether (DPE) | 17.3 | 0 | 0 |
| 2-Chloromethyl DPE | 5.3 | 0.3 | 0 |
| 4-Chloromethyl DPE | 42.9 | 2.4 | 0 |
| 2,4'-Bis(chloromethyl)DPE | 10.8 | 17.7 | 1.9 |
| 4,4'-Bis(chloromethyl)DPE | 20.6 | 68.5 | 8.6 |
| Tris(chloromethyl)DPE | 2.3 | 10.5 | 89 |
| Tetrakis(chloromethyl)DPE | <1 | <1 | <2 |

In the reaction to form the polyamines of this invention, one or more alkylene polyamines of the general Formula II as given above are employed. Such amines are readily prepared, for example, by the reaction of an alkylene dichloride such as ethylene or propylene dichloride with ammonia. Typical of suitable reactants are ethylenediamine, diethylenetriamine, triethylenetetramine, propylenediamine, 1,6-hexanediamine, etc.

The condensation reaction herein involved is of the general type illustrated in Equation 1.

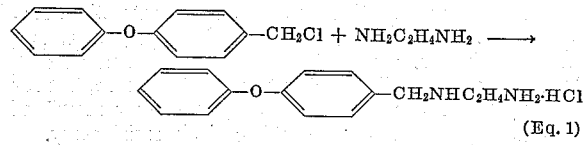

(Eq. 1)

The reaction is generally both rapid and highly exothermic. Since the alkylene polyamine reactant provides multiple amino groups for condensation with the halomethyl groups, polymerization and cross-linking occur readily unless a large excess of alkylene polyamine is employed. Obviously, still further possibilities for polymerization and cross-linking are introduced when diphenyl ethers having multiple halomethyl groups are employed.

It has been found that the type of polyamine product obtained by the condensation described herein is largely dependent on the relative proportions of the alkylene polyamine and halomethyldiphenyl ether utilized, and more specifically on the mole ratio of alkylene polyamine to halomethyl groups.

In the reaction of an alkylene polyamine with a 4,4'-bis(halomethyl)diphenyl ether, it has been found that with a mole ratio of alkylene polyamine to halomethyl groups greater than about 2.0, water-soluble, monomeric products are obtained having a single diphenyl ether moiety per molecule. While these products are obtained in satisfactory yields with a mole ratio of from 2.0 to 10 or more, a ratio of about 4 to 5 generally is preferred to minimize the recovery of excessive amounts of unreacted alkylene polyamine. The crude monomeric product obtained by stripping excess alkylene polyamine may contain small amounts of dimers and other by-products. While it can be further purified when necessary by such techniques as fractional distillation at reduced pressure, the crude product is also highly effective and desirable as a curing agent for epoxy resins.

With a mole ratio of alkylene polyamine to halomethyl groups of from about 1.5 to 2.0, rubbery low molecular weight polymers are obtained from the 4,4'-bis(halomethyl)diphenyl ethers. These materials contain a plurality of diphenyl ether moieties, but are only lightly cross-linked. Although generally insoluble in water, these products swell in polar solvents and can be blended with epoxy resins. They are useful not only as curing agents for epoxy resins, but also for such other applications as water-insoluble caulking agents, rubber modifiers, etc.

With halomethyldiphenyl ethers and mixtures thereof having an average number of halomethyl groups appreciably different than about two, the relative amounts of mono- and/or tris(halomethyl)diphenyl ether must also be considered in determining optimum formulations. However, in general, use of 4 or more moles of alkylene polyamine per halomethyl group will give good yields of monomeric products with most reactant mixtures. More exact formulations within the scope of this invention are easily determined by those skilled in the art.

The above polyamines are prepared by mixing the halomethyldiphenyl ether and the alkylene polyamine reactants at a temperature ranging from about 0° to 120° C. with a reaction time ranging from a few minutes to several hours depending upon the reaction temperature and the relative proportion of reactants used. The extent of reaction is easily determined by analysis for ionic halide. Although the reaction is exothermic, the reaction temperature may be controlled by using appropriate addition rates as well as by cooling or heating the stirred reaction mixture as required. Inert diluents such as liquid aliphatic or aromatic hydrocarbons are often employed to moderate the reaction and to facilitate contact of the reactants. When the reaction is essentially complete, the reaction mixture is usually treated with an inorganic base such as sodium hydroxide, potassium carbonate, or the like to neutralize the by-product acid and thus liberate the polyamine from the initially formed amine hydrohalide. Thereafter, the mixture is treated by conventional means such as distillation, filtration, extraction, etc., to remove the excess unreacted alkylene polyamine and other impurities. The products may be further purified by such means as distillation at reduced pressure, but for many applications the crude product after removal of the excess alkylene polyamine is entirely satisfactory.

The following examples are given to illustrate the compositions that may be prepared in accordance with the present invention, but are not to be construed as limiting the invention thereto. Unless otherwise specified, all parts and percentages are by weight.

EXAMPLE 1

*N,N''-oxybis(p-phenylenemethylene)bis-ethylenediamine*

To 300.5 parts (5.0 moles) of ethylenediamine stirred and heated to 45–50° C. was added dropwise over a period of 15 minutes a solution of 133.5 parts (0.5 mole) of 4,4'-bis(chloromethyl)diphenyl ether in an equal weight of toluene. The mole ratio of ethylenediamine to chloromethyl groups was 5.0. By heating and cooling the reaction mixture as required, the temperature was held between 45° and 50° C. during the addition and for another hour to insure complete reaction. Then 86 parts (1.1 moles) of 50% aqueous sodium hydroxide was added to neutralize the by-product hydrogen chloride and liberate the free amines. Excess ethylenediamine, water, toluene, and other volatile materials were removed from the reaction product by distillation to a final pot temperature of 125° C. with a reduced pressure of 20 mm. Hg.

The residual product was diluted with an equal weight of toluene and filtered to remove sodium chloride and other insoluble material. After restripping to a final temperature of 130° C. at 20 mm. Hg, 151.5 parts of crude N,N''-oxybis(p-phenylenemethylene)bis-ethylenediamine was obtained, a crude yield of 96.5%. The product was a light yellow liquid with a refractive index ($n_D^{25}$) of 1.5879 and a Gardner tube viscosity of approximately 9 stokes. Its purity was about 84% as determined by potentiometric titration and about 88% based on a total nitrogen content of 16.55 wt. percent (calcd. for $C_{18}H_{26}N_4O$: 17.83% N).

A sample of the crude product was purified by distillation (B.P. 248–250° C./0.75 mm. Hg). The resulting clear light yellow liquid had a $n_D^{25}$ of 1.5820, a Gardner viscosity of about 2.6 stokes, and a minimum purity of 94% by potentiometric titration and 95% based on a nitrogen content of 17.35 wt. percent.

EXAMPLE 2

*Condensation of 4,4'-bis(chloromethyl)diphenyl ether with ethylenediamine*

Using the general process described in Example 1, varying proportions of ethylenediamine (EDA) and 4,4'-bis(chloromethyl)diphenyl ether (CMDPE) were condensed and the crude products characterized as given in Table II.

TABLE II.—CONDENSATION OF 4,4'-BIS(CHLOROMETHYL) DIPHENYL ETHER WITH ETHYLENEDIAMINE

| Run | Mole Ratio, EDA/—CH₂Cl | Product | | | |
|---|---|---|---|---|---|
| | | Yield ᵃ percent | Appearance | $n_D^{25}$ | Wt. percent N |
| 2-1 | 1.5 | -------- | Rubbery polymer | -------- | 11.7 |
| 2-2 | 2.0 | 86 | Very viscous yellow liquid. | 1.6077 | 13.07 |
| 2-3 | 3.0 | 91 | Viscous light yellow liquid. | 1.5952 | 15.18 |
| 2-4 | 4.0 | 95.5 | Light yellow liquid | 1.5895 | 16.20 |
| 1 | 5.0 | 96.5 | do | 1.5879 | 16.55 |

ᵃ Wt. percent based on a monomeric molecular weight of 314.

EXAMPLE 3

*Condensation with other alkylene polyamines*

A. Diethylenetriamine (DETA) was condensed with 4,4'-bis(chloromethyl)diphenyl ether using the general process of Example 1 and a mole ratio of DETA/—CH₂Cl of 5.0. The crude product was a viscous light brown liquid which contained 19.8 wt. percent N. Calculated for the monomeric product, 20.99 wt. percent N.

B. 1,6-hexanediamine (HDA) was condensed with 4,4'-bis(chloromethyl)diphenyl ether using the general process of Example 1 and a mole ratio of HDA/—CH₂Cl of 5.0. The crude product was a viscous light brown liquid which contained 12.3 wt. percent N. Calculated for the monomeric product, 13.14 wt. percent N.

EXAMPLE 4

*Crude (chloromethyl)diphenyl ethers*

In a manner similar to Example 1, several crude chloromethyldiphenyl ethers (CMDPE) were reacted with ethylenediamine (EDA) to prepare other representative compositions of the invention. The reactants, proportions used, and properties of the compositions obtained are summarized in Table III. Other crude chloromethyl or bromomethyldiphenyl ethers can also be employed.

TABLE III.—CONDENSATION OF CRUDE CHLOROMETHYLDIPHENYL ETHERS WITH ETHYLENEDIAMINE

| Run | CMDPE a | Mole Ratio, EDA/—CH₂Cl | Product |
|---|---|---|---|
| 4-1 | CMDPE-25 | 5.2 | Light brown liquid; percent N: calcd. 17.08; found 17.1. |
| 4-2 | CMDPE-17 | 6.7 | Light brown liquid; percent N: calcd. 11.57; found 9.8. | a Cf. Table I for typical compositions.

EXAMPLE 5

Epoxy resins

A. To 23.9 parts of the crude product described in Example 3A was added 56.1 parts of the diglycidyl ether of bisphenol A. After mixing, the material was poured into a standard 4½ x 4½ x ⅛ inch mold. The mixture hardened on standing overnight at room temperature into a trough, essentially infusible resinous sheet having an average thickness of 0.150 inch. Test specimens cut from the resin sheet in the conventional manner had a tensile strength of 4630 p.s.i. with a 1.8% elongation.

The same epoxy resin cured with diethylenetriamine alone under similar conditions had a tensile strength of 5980 p.s.i. with an elongation of 2.0%.

B. In a like manner the epoxy resin was cured with other polyamines described in Examples 1–4 giving similar tough, essentially infusible resinous sheets. Typical tensile data are included in Table IV. Comparison with resin sheets prepared with ethylenediamine or 1,6-hexanediamine alone was not possible since the sheets prepared with these diamines were too brittle to cut into test bars. Incorporation of the diphenyl ether moiety into the structure of the curing agent clearly resulted in a more resilient cured resin.

TABLE IV.—POLYAMINE CURED EPOXY RESINS

| | Polyamine | | Tensile Test | | |
|---|---|---|---|---|---|
| Example | Amine | CMDPE | Av. Thickness, in. | Elongation, percent | Tensile, p.s.i. |
| 1 | EDA | 4,4'-bis CMDPE | 0.160 | 2.7 | 4,960 |
| 3B | HDA | 4,4'-bis CMDPE | 0.135 | 0.75 | 2,450 |
| 4-2 | EDA | CMDPE-25 | 0.165 | 1.0 | 3,260 |

I claim:
1. The condensation product of:
 (1) a halomethyldiphenyl ether selected from the group consisting of
  (a) halomethyldiphenyl ethers of the general formula:

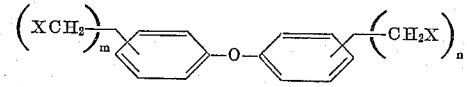

wherein $m$ is an integer from 1 to 2, $n$ is an integer from 0 to 2, and X being selected from the group consisting of chlorine and bromine, and
  (b) mixtures thereof; with
 (2) at least one alkylene polyamine of the general formula:

$$NH_2(C_aH_{2a}NH)_bH$$

wherein $a$ is an integer from 2 to 6, and $b$ is an integer from 1 to 4;
said reactants being used in such proportions that the mole ratio of alkylene polyamine to halomethyl groups is at least 1.5.

2. The product of claim 1 wherein the alkylene polyamine is ethylenediamine.
3. The product of claim 1 wherein the halomethyldiphenyl ether is a mixture of chloromethyldiphenyl ethers, said mixture having an average of from 1.0 to 3.0 chloromethyl groups per diphenyl ether moiety.
4. The product of claim 3 wherein the alkylene polyamine is ethylenediamine.
5. The product of claim 1 wherein the halomethyldiphenyl ether is 4,4'-bis(chloromethyl)diphenyl ether.
6. The product of claim 5 wherein the alkylene polyamine is diethylenetriamine.
7. The product of claim 5 wherein the alkylene polyamine is 1,6-hexanediamine.
8. The product of claim 5 wherein the alkylene polyamine is ethylenediamine.
9. The product of claim 1 wherein the halomethyldiphenyl ether is 4,4'-bis(bromomethyl) diphenyl ether.
10. The product of claim 9 wherein the alkylene polyamine is ethylenediamine.

References Cited in the file of this patent
UNITED STATES PATENTS
3,098,841    Morris et al. _____ July 23, 1963

CHARLES B. PARKER, Primary Examiner.
IRVING MARCUS, Examiner.